United States Patent [19]

Friesen

[11] 4,129,978

[45] Dec. 19, 1978

[54] HARVESTER SWATH PICKUP

[76] Inventor: David Friesen, Box 154, Plum Coulee, Manitoba, Canada

[21] Appl. No.: 871,705

[22] Filed: Jan. 23, 1978

Related U.S. Application Data

[63] Continuation-in-part of Ser. No. 640,887, Dec. 15, 1975, abandoned.

[51] Int. Cl.² .................................... A01D 89/00
[52] U.S. Cl. ............................................. 56/364
[58] Field of Search ............... 56/364, 130, 220, 226, 56/227

[56] References Cited

U.S. PATENT DOCUMENTS

| 2,727,350 | 12/1955 | Kuhlman | 56/364 |
| 3,751,888 | 8/1973 | James | 56/364 |

Primary Examiner—Jay N. Eskovitz
Attorney, Agent, or Firm—Stanley G. Ade

[57] ABSTRACT

A swath pickup includes a pair of spiders one on each end of a frame and angulated with respect to the direction of travel. A forked inwardly offset arm is pivotally secured to blocks on the outer ends of each arm of the spiders in the form of a universal joint and a transversely extending member from which pickup teeth extend, extends between each offset arm on one spider and the corresponding offset arm on the other spider. The spiders are rotated by a motor and the angular relationship of the spiders causes the members and the pickup teeth to reciprocate transversely as they rotate. The offset arms enable a pickup of reduced diameter to be provided which increases the efficiency of the pickup action yet provides sufficient room at the spiders for the installation and operation of the universal joints and arms to the spiders.

2 Claims, 4 Drawing Figures

HARVESTER SWATH PICKUP

BACKGROUND OF THE INVENTION

This invention relates to new and useful improvements in pickup attachments for grain combines, having particular reference to a type of pickup in which a sidewise motion is imparted to the pickup teeth in order to provide greater efficiency in picking up the swath, and constitutes a continuation-in-part application of Ser. No: 640,887, filed Dec. 15th, 1975 and now abandoned.

In the art to which the invention relates pickups for grain combines and for like purposes usually have a rotating assembly with teeth for picking up a swath to be harvested and delivering it to the combine table. In this the teeth travel straight ahead in conformity with the direction of travel of the combine and in consequence meet the grain swath head on and do not pick up all of the grain in the swath.

SUMMARY OF THE INVENTION

It has been proposed to remedy this by imparting a sidewise motion to the pickup teeth to engage the swath at an angle to the line of travel thereof, and it is with this type of grain pickup that the present improvements are concerned.

The invention comprises a pair of spaced and parallel spiders journalled for rotation one upon each end of said frame bar and operatively connected to said source of power, for rotation thereby, said spiders being inclined at an angle to the direction of travel and having a plurality of radially extending arms thereon, a transversely extending member extending between the outer ends of each arm on one of said spiders and the outer end of the corresponding arm on the other of said spiders, pickup teeth extending radially from the outer side of each of said members and universal joint means operatively connecting each end of each of said members to the corresponding outer ends of the arms of the spiders to which it is attached, said outer ends of each member being offset inwardly from the outer ends of the spiders, towards the rotational axis of each spider, said members and said teeth reciprocating transversely of said frame bar, when rotating, each universal joint including a block journalled to the outer end of each arm of said spider, each offset outer end of said member including a forked end pivotally connected to the associated block.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Figure 1:
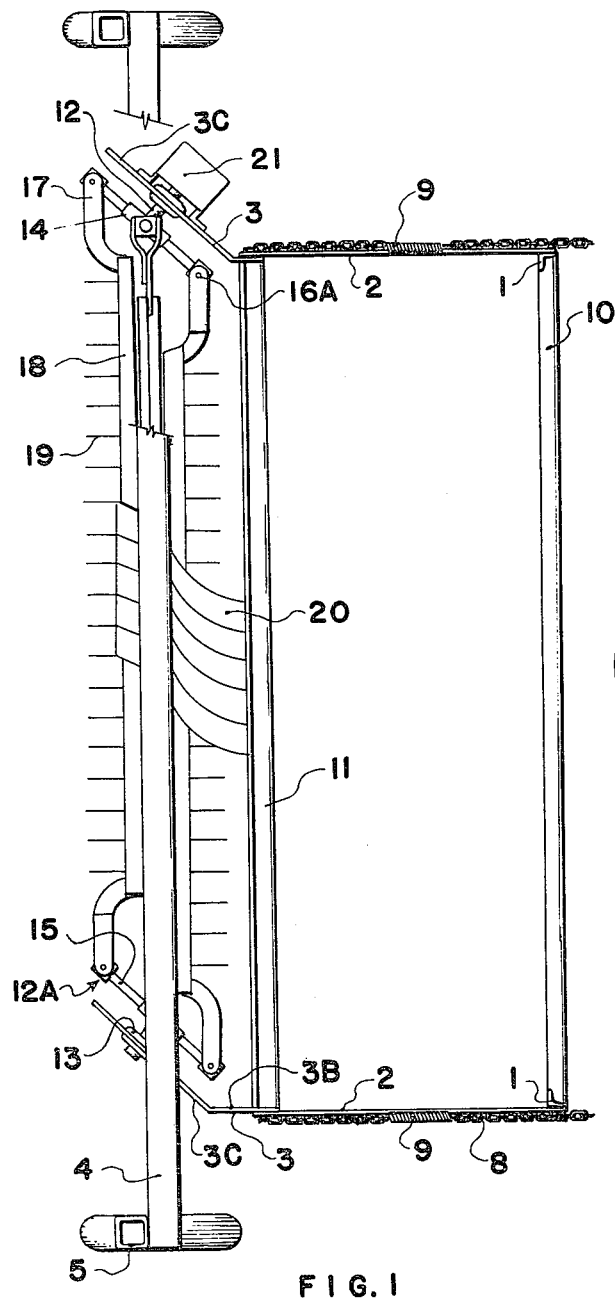
FIG. 1 is a top plan view of the pickup attachment, shown with part broken away for convenience of illustration
Figure 2:
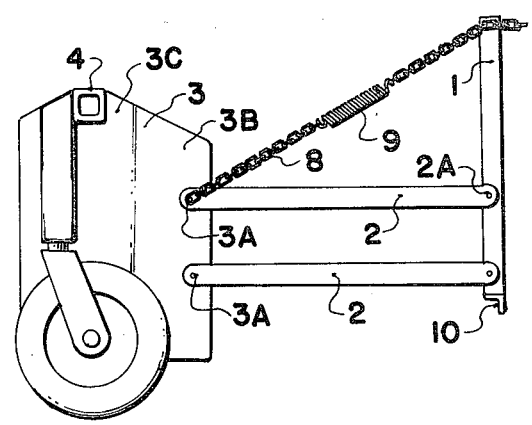
FIG. 2 is a side view of the assembly as illustrated in FIG. 1.
Figure 3:
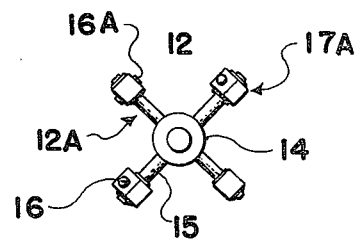
FIG. 3 is a view of one of the supports or spiders taken in the direction of arrow A illustrated in FIG. 1.
Figure 4:
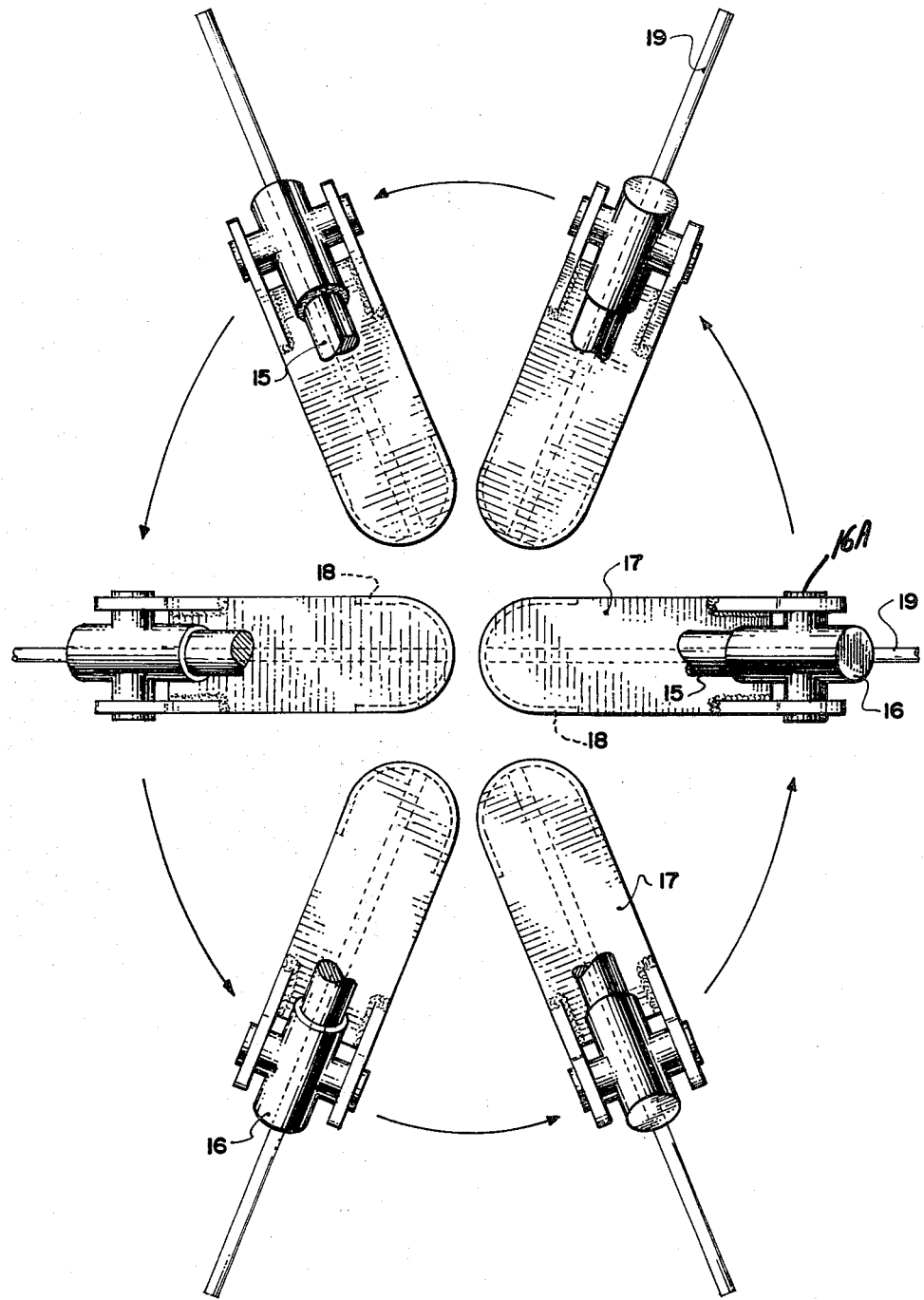
FIG. 4 is an enlarged fragmentary partially schematic end view of FIG. 3 showing the relative positions of one of the universal joints through one revolution.

Having reference to the drawings, 10 indicates a cross frame bar forming a fixed part of the combine table to which the picked up swath is to be delivered, and to this frame bar are fixed right and left support bars in a vertical and parallel position, generally indicated by the numeral 1, rearwardly connected to the top and rear of the combine table by means of chains indicated generally by number 8 and springs indicated generally by number 9.

Forwardly connected to vertical support bars 1 are four forwardly mounted horizontal support bars 2, two left and two right, said bars 2 being connected to vertical bars 1 by means of pivots 2A that permits the forward ends of said bars 2 to move up and down schematically vertically, relative to rearward portion of said bars 2 where bars 2 are connected to vertical bars 1 by means of said pivots 2A.

Spaced and parallel vertical plates 3 are pivotally connected one on each side to the forward ends of bars 2 by means of pivots 3A. These plates include attaching portions 3B which extends forwardly parallel to the bars 2 and distal portions 3C which incline sideways relative to the direction of travel as clearly shown in FIG. 1. Vertical plates 3 are apertured to accommodate a bearing housing and a bearing in said housing, indicated by numbers 13, as is common in the art. Shafts 12, mounted for rotation in each of said bearings 13 are fixed to tow spiders 12A, one right and one left. Each of the said spiders consists of a hub 14, an equal number of legs 15, and a block 16 journalled on the end of each of said legs 15 by means of stub shafts 15A. An offset forked arm 17 is pivotally attached to each of said blocks 16 by means of stub shafts 16A thus forming a universal joint connection consisting of parts 15, 16, 16A and 17.

Each offset forked arm 17 includes a forked end pivotally securable to one of the blocks and having a portion that curves inwardly towards the center of the spiders and transversely extending rods or members 18 from which a plurality of pickup teeth extend on the outer side of the member, are connected by the ends thereof to the inner ends of the opposite forked arms one on each spider.

The said universal joints permit these horizontal bars 18 with pickup teeth 19 attached thereto, to move sidewise at an angle to the line of travel of the pickup assembly.

The upper portions of plates 3 are connected to a horizontal brace or bar 4, which is parallel to cross frame bar 10 at the forward portion of the combine table.

At the extreme ends of horizontal bar 4, are mounted vertical bars 5 to which are connected castor wheels 7 to support the forward portion of pickup.

Between the rearward portion of plates 3, in a horizontal position and parallel to cross frame bar 10 is mounted a bar 11 to support a plurality of spaced and parallel strippers 20, and said strippers form a housing for the above mentioned teeth carrying rods 18. These strippers also form sliding surfaces therebetween to allow the pickup teeth to convey the swath to a conveyor for conveyance to the combine table as is common in the art.

The spiders and pickup assembly are rotated by motor 21 secured at one end thereof and may take the form of an hydraulic motor or any other convenient source of power.

As the spiders are rotated by motor 21, the angle of inclination of spiders causes the members 18 to reciprocate transversely as they rotate with the pickup teeth following slots formed between the strippers 20.

The offset relationship of the forked arms 17 gives several advantages over conventional pickup construction. Firstly it permits a relatively small diameter pickup to be used which means that the swath does not have to be elevated as much as if the pickup was the full diameter of the spiders and this leads to increased efficiency. At the same time the spiders have to be of a given diameter in order that sufficient room be provided for the formed ends of the arms, the blocks and the universal joint connections and for the rotation and operation of same.

Further, the degree of sideways movement of the members and pickup teeth is increased due to the shape and location of the offset arms thus giving a more efficient action to the pickup.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. In a grain pickup for attachment to a harvester which includes a transverse frame bar and a source of power, said pickup being supported within said frame bar, said pickup comprising in combination a pair of spaced and parallel spiders journalled for rotation one upon each end of said frame bar and operatively connected to said source of power for rotation thereby, said spiders being inclined at an angle to the direction of travel and having a plurality of radially extending arms thereon, a transversely extending member extending between the outer ends of each arm on one of said spiders and the outer end of the corresponding arm on the other of said spiders, pickup teeth extending radially from the outer side of each of said members and universal joint means operatively connecting each end of each of said members to the corresponding outer ends of the arms of the spiders to which it is attached, said outer ends of each member being offset inwardly from the outer ends of the spiders, towards the rotational axis of each spider, said members and said teeth reciprocating transversely of said frame bar, when rotating, each universal joint including a block journalled to the outer end of each arm of said spider, each offset outer end of said member including a forked end pivotally connected to the associated block.

2. The device according to claim 1 which includes stripping plates secured to said frame bar and defining a helical slot between adjacent stripper plates, said pickup teeth running in said helical slots as said pickup rotates.

* * * * *